United States Patent [19] [11] 3,709,574
Potter [45] Jan. 9, 1973

[54] LOCKING DEVICE FOR A BEARING OR THE LIKE

[75] Inventor: Howell L. Potter, New Britain, Conn.

[73] Assignee: Textron, Inc., Providence, R.I.

[22] Filed: Sept. 9, 1971

[21] Appl. No.: 179,008

Related U.S. Application Data

[63] Continuation-in-part of Ser. No. 134,649, April 16, 1971, abandoned.

[52] U.S. Cl. ...............................................308/236
[51] Int. Cl. .............................................F16c 35/06
[58] Field of Search .........308/236; 287/52.09, 52.07

[56] References Cited

UNITED STATES PATENTS 2,697,622  12/1954  Leister ................................308/236
2,729,479  1/1956   Leister ................................308/236
2,584,740  2/1952   Reynolds ............................308/236

Primary Examiner—Milton Kaufman
Assistant Examiner—Frank Susko
Attorney—Sandoe, Hopgood and Calimafde

[57] ABSTRACT

The invention contemplates clip means having relatively free but unit-handling assembled relation to the bearing ring or the like which it is to secure, in the ultimately fitted, installed condition of the ring. An axial tongue of the clip is held in an eccentric arcuate relief in the cylindrical ring surface to be mounted. The assembled and installed position of the ring is secured by angularly displacing the clip, and therefore the tongue, toward one of the circumferential limits of the relief.

23 Claims, 12 Drawing Figures

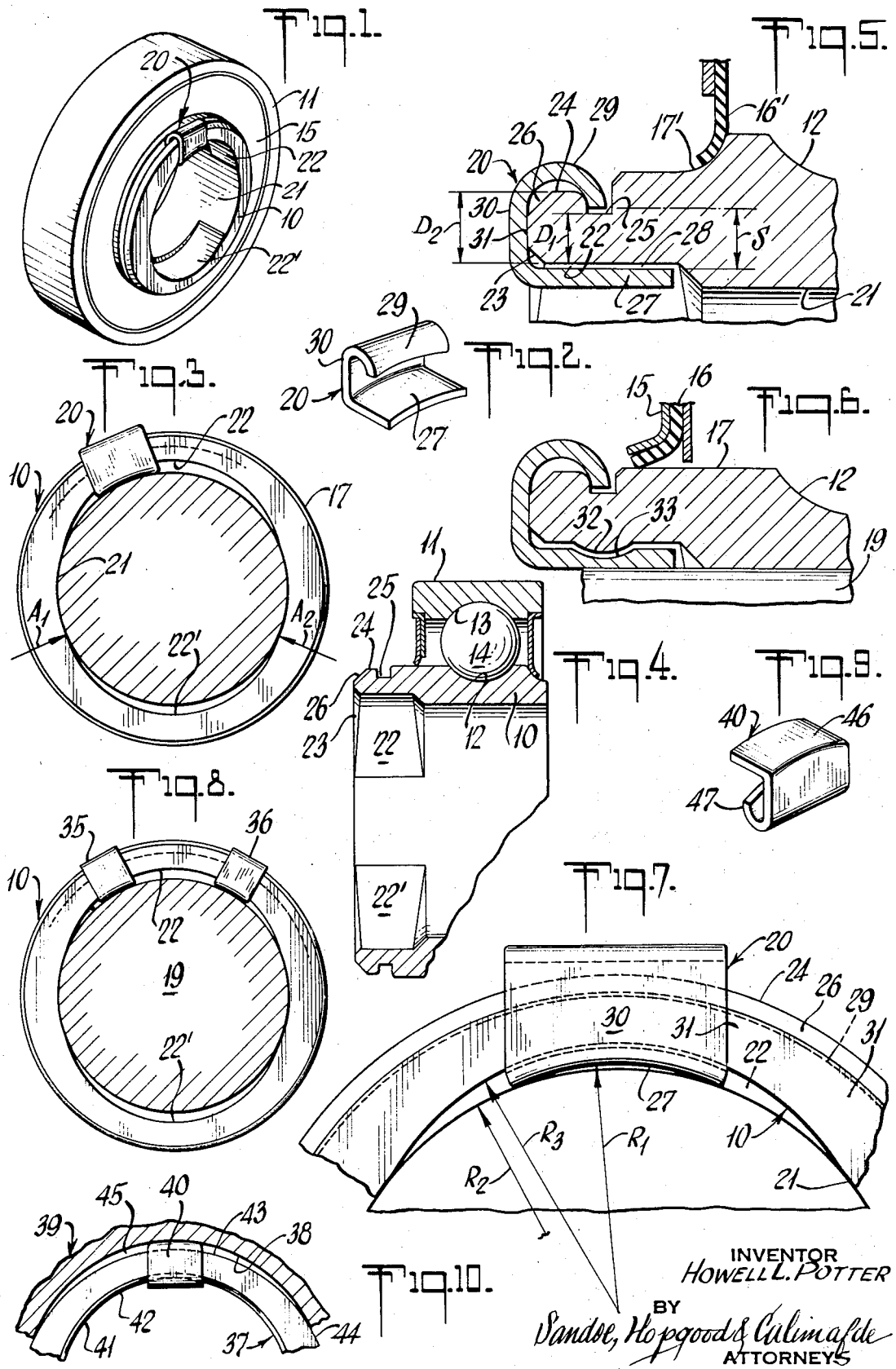

INVENTOR
HOWELL L. POTTER
BY
Sandoe, Hopgood & Calimafde
ATTORNEYS

LOCKING DEVICE FOR A BEARING OR THE LIKE

This application is a continuation-in-part of my copending application, Ser. No. 134,649, filed Apr. 16, 1971, now abandoned.

The invention relates to locking means for securely mounting a bearing ring or the like.

It is an object of the invention to provide improved means of the character indicated.

It is another object to provide improved locking means involving a minimum of additional axial length to an assembled bearing or the like.

A further object is to achieve the foregoing objects with a structure which will not substantially affect the running efficiency of an antifriction bearing embodying the invention.

A specific object is to provide a ring lock of suitably formed spring-ribbon stock, self-retained as a clip on the inner ring of a bearing, and enabling simple and free assembly of the ring and clip to a shaft, followed by angular displacement of the clip to achieve the locked condition.

Another specific object is to provide a ring lock of suitably formed spring-ribbon stock, self-retained on the outer ring of a bearing, and enabling simple and free assembly of the ring and clip to the ultimate mounting bore, followed by angular displacement of the clip to achieve the locked condition.

It is a general object to achieve the above objects with a simple construction involving a minimum of manufacturing expense, a maximum of locking effectiveness, and simplicity of use.

Other objects and various further features of novelty and invention will be pointed out or will occur to those skilled in the art from a reading of the following specification in conjunction with the accompanying drawings. In said drawings, which show, for illustrative purposes only, preferred forms of the invention:

FIG. 1 is a perspective view of an antifriction bearing, assembled in unit-handling relation with locking means of the invention;

FIG. 2 is an enlarged perspective view of the locking element in FIG. 1;

FIG. 3 is an end elevation of the locked ring part of FIG. 1, shown in locked condition on a shaft, the shaft being shown in section, for a better viewing of the parts relationship;

FIG. 4 is a longitudinal sectional view of the bearing of FIG. 1, prior to locking-element assembly thereto;

FIG. 5 is an enlarged fragmentary longitudinal sectional view of locking elements in preassembled, unlocked relation;

FIG. 6 is a view similar to FIG. 5 to show a modification;

FIG. 7 is an enlarged fragmentary end elevation of the locking elements of FIG. 5;

FIG. 8 is a view similar to FIG. 3, to show a modification;

FIG. 9 is a view similar to FIG. 2, to show a modification;

Figure 11:
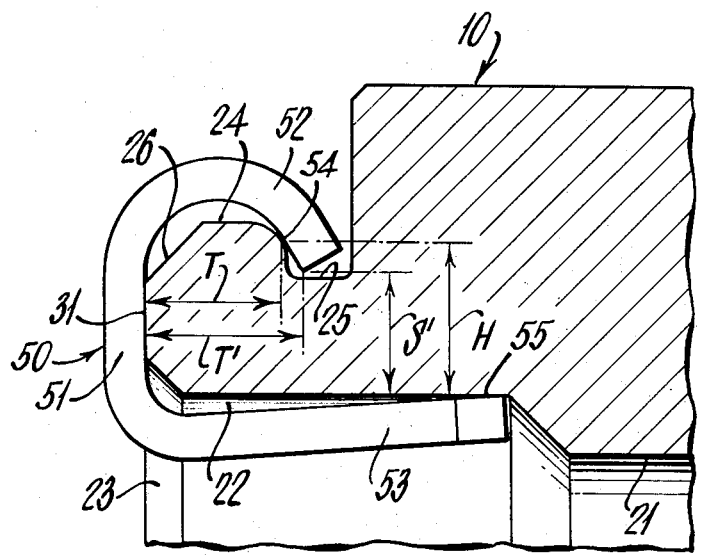
Figure 12:
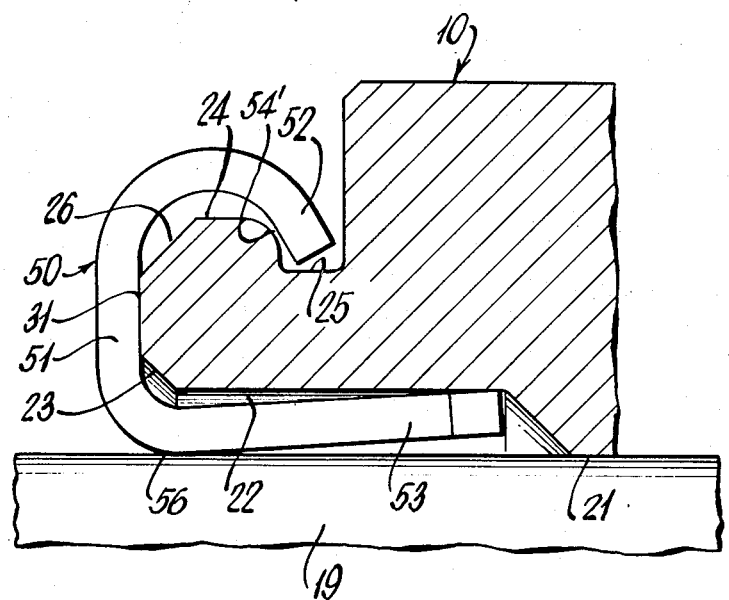

FIG. 10 is a fragmentary end elevation of a bearing ring employing the modified locking element of FIG. 9, and locking said ring in a mounting bore, the mounting element being shown in section, for a better viewing of the parts relation; and FIGS. 11 and 12 are enlarged, framentary, sectional views similar to FIG. 5, to show a further modification, FIG. 11 being specific to the relation prior to assembly to a shaft, and FIG. 12 being specific to the relation after assembly to the shaft but prior to setting the lock.

Referring to FIGS. 1 to 5 and 7, the invention is shown in application to an antifriction bearing comprising inner and outer rings 10–11 having opposed raceways 12–13, and with plural antifriction elements 14 riding the raceways and holding the rings 10–11 in relatively rotatable and coaxial relation. Shield and/or seal means may close the respective ends of the bearing; at the end which is exposed in FIG. 1, such means includes an outer metal plate 15 carried by outer ring 11. As best seen in FIG. 6, plate 15 may be axially flared at its inner limit to protect a resilient seal 16 which is formed and stressed for wiping engagement with the outer cylindrical surface 17 of ring 10. The axial end of ring 10 projects outwardly beyond such seal region, for locking purposes to be explained, in connection with mounting to a shaft 19.

Locking-clip means 20 of the invention is carried in unit-handling relation with the projecting end of inner ring 10. For this purpose, the cylindrical bore 21 of ring 10 is relieved at 22 over a limited arcuate extent about an axis eccentric to the bearing axis, and the axial extent of the relief 22 preferably terminates at the general plane of shield and seal mounting, thus leaving the substantial body of ring 10 unaffected by the relief, so that race distortion attributable to locking action is inconsequential. The eccentric offset is in the order of 10 to 15 percent of the radius of bore 21, and the radius of the arcuate relief may be in the order of 85 to 90 percent of the bore radius. Thus, the limited arcuate extent of the relief 22 is in the range of substantially 90° to 140°; it is preferably 100° to 120°. Preferably also, a second relief 22' is symmetrically formed at the diametrically opposite location; both reliefs 22—22' may be readily formed by the same milling cutter and in the same work set-up, being produced by like radial feeds, in succession and in opposite directions, with respect to the central axis of ring 10. A suitably formed such milling cutter may also produce an eccentric chamfer, as at 23, at the outer edge of the relief.

To retain the clip means 20, the outer surface of the projecting end of ring 10 includes a circumferentially extending radial flange formation 24, which in the form shown is defined by a circumferentially continuous radial groove 25 between the shield-seal region 15–16 and the axial end, and therefore between the race 12 and the axial end of ring 10. A chamfer 26 is formed at the outer edge, to substantially match the radial spread between flange 24 and the bottom of groove 25.

As best seen in FIG. 2, the clip means 20 is of generally C-shape; it is formed of stiffly complaint material such as spring-ribbon steel, suitably hardened after shaping. The lower end of the C-shape is tongue 27, of circumferential extent substantially less than the circumferential extent of the relief 22 in which it is received. The thickness of tongue 27 is such as to be so received with a clearance, designated 28 in FIG. 5, at the location of maximum radial relief. The axial extent of tongue 27 preferably overlaps the location of groove 25, as shown.

The other end of the C-shape of clip means 20 is hooked, at 29, for engagement over flange 24, being retained in groove 25, and a substantially flat integral central section 30 connects the two ends 27–29; for stability, the radially inwardly directed edge of end 29 is arcuate, as shown, to pilot on the bottom of groove 25. Preferably, the axial span between the hooked end 29 and the flat central section 30 is such, in relation to the span between the end face 31 (of ring 10) and the adjacent wall of groove 25, that the clip means 20 is naturally oriented and stabilized in the manner shown in FIG. 5. Preferably also, the unstressed radial span S between tongue 27 and the hooked end 29 slightly exceeds the radial distance $D_1$ between groove 25 and the maximum radial depth of relief 22, and span S is less than the radial distance $D_2$ between flange 24 and the maximum radial depth of relief 22, thus assuring self-retention in unstressed condition of the clip means, to provide ready actuation in the circumferential direction needed to achieve lock action.

More specifically, the tongue 27 is preferably arcuate for accommodation of greater tongue body in the crescent-shaped void created by relief 22. As seen in FIG. 7, the radius $R_1$ of this arc is preferably no greater than the bore radius $R_2$ and may be in the order of 85 to 100 percent thereof; the tongue radius also is preferably at least no less than the relief radius $R_3$. With such relationships, it will be appreciated that regardless of the direction of angular displacement of tongue 20 to set the lock, the high points of wedging contact will always occur at least at one of the circumferential ends of the arc of the tongue. It will be appreciated, however, that for many applications an adequate fastening of the inner ring to a shaft may be achieved without strict adherence to these stated preferred dimensional relationships.

FIG. 6 illustrates a modification wherein a radially inward bead 32 extends for the circumferential span of relief 22, for locating alignment with a corresponding circumferentially extending groove or recess 33, which may be a peened formation in the upper surface of tongue 27. It will be appreciated that on tongue displacement to lock against the shaft 19, the bead-groove engagement 32–33 becomes firm, to provide added assurance of anchorage, particularly in axially loaded situations.

FIG. 8 illustrates another modification, for particular use in the situation in which the bearing is to be reversibly operated. Parts in FIG. 8 are as previously described, except that two like clips 35–36 of the invention are employed, to provide wedge-lock action with respect to shaft 19, regardless of the direction of rotation. Each of the lock clips 35–36 may be entered into a different one of the reliefs 22–22', and then displaced to jam in opposite directions, or they may be received in the same single relief 22, as shown. For this purpose, the clips 35–36 may be in all respects as described for clip 29 of FIG. 2, except that they are shown with lesser arcuate extent, to enable them to be in side-by-side adjacency, at the radially deepest part of relief 22, when assembled to shaft 19. A simple driving took, such as a hammer, cold chisel or the like, will suffice to spread and ram the clips 35–36 into their oppositely directed wedge positions shown.

FIGS. 9 and 10 illustrate that principles of the invention are also applicable to the retention of a ring, such as the outer bearing ring 37 in a mounting bore 38, such as the bore of a hub forming part of a pulley, gear or the like 39 which rides on the bearing. It will be understood that outer ring 37 is formed as described for inner ring 10, except that inwardly and outwardly directed parts and functions are reversed. Thus, the locking clip 40 is carried in unit-handling preassembled relation with an axially projecting end of the ring 37. The flange 41, and the groove (not shown) by which it is defined, both extend radially inwardly, there being an inner end chamfer 42 of radial extent substantially matching the depth of the groove. The relief 43 is preferably one of two, formed at diametrically opposed locations in cylindrical outer surface 44 of the outer ring 37. The crescent-shaped void 45 is thus defined for accommodating lock action, upon wedging the clip tongue 46 angularly in the direction of a circumferential limit of the void 45. The flange or groove-engaging part 47 of the clip is a radially outwardly directed hook end of the clip 40.

The described construction in all its forms is seen to meet all stated objects. It represents almost an irreducible minimum in cost, and it is highly effective. When the lock is set, for the case of opposed reliefs (e.g., 22–22'), stability is enhanced by virtue of local clamp reaction at the widely spaced locales at ends of the opposite relief 22', as suggested by heavy arrows $A_1-A_2$ in FIG. 3. The clip means of the invention may be applied by the bearing manufacturer, thus becoming part of the preassembled bearing, for unit-handling therewith, or it may be applied after the bearing has been preliminarily assembled to its mount, whether the mount is a shaft or a bore. Regardless of when the clip means is assembled to its ring, axial pressure as by a light hammer tap, is all that is needed to cause the hooked end (29 or 47) to engage and respond to cam action by the ring chamfer (26 or 42), so that the clip may snap into its desired retained position once it clears the flange.

The principles governing shape of tongue 27 apply equally to tongue 46, except of course that the curvatures are reversed. Thus, tongue 46 is preferably arcuate, with a radius of curvature that is at least no less than the radius of the outer cylindrical surface 44 being, for example, in the order of 100 to 115 percent thereof; the tongue radius also is preferably at least no greater than the radius of relief 43.

While the invention has been described in detail for the preferred forms shown, it will be understood that modifications may be made without departure from the invention. For example, FIGS. 5 and 6 happen to be shown for different styles of wide inner ring. The ring 10 of FIG. 6 is more shallow, and groove 25 and flange 24 are formed in the outer cylindrical surface 17 thereof; by the same token, the inner ring of FIG. 5 is deeper, with a rabbet 17' (in the outer cylindrical surface) to accommodate a flexible seal 16', but even so, the groove 25 and flange 24 of FIG. 5 may be considered as formed in the outer generally cylindrical surface of the inner ring.

Also, for example, the locking clip 50 may be so formed with reference to the flanged and relieved end of ring 10 that it frictionally retains a desired angular position on the inner ring, all as illustrated in FIGS. 11 and 12. In FIGS. 11 and 12, most of parts have elements and formations already described, and so the same reference numbers are used. However, in FIGS. 11 and 12, the effective inside radial span S' and offset T' of the clip 50 are such, in relation to the effective radial height H and axial thickness T of flange 24 (at the location of maximum eccentric relief 22), that light resilient frictional drag characterizes the clip-to-ring engagement, even in the absence of shaft insertion. For the form shown, clip 50 has an upstanding central portion 51 between a hook end 52 and a tongue end 53, and the tongue end 53 is bent inward, to a slightly acute angle with respect to portion 51, to establish the reduced span S' noted above. Thus, the modified clip 50 is slightly outwardly sprung in the FIG. 11 position, permitting light frictional hold by way of ring contact at 54-31-55.

In use, as when two clips 50 are set on a single ring (as in the manner explained above for clips 35-36 of FIG. 8), the frictional-engagement property of clips 50 will enable both of them to stay in adjacent relation at the location of maximum relief at the eccentric surface 22. This enables simple shaft-insertion, in the course of which the heel region 56 (FIG. 12) of each clip 50 lightly interferes with, and rides upon, the shaft 19, to cause a slight relief of contact 54 or a clearance, suggested at 54' in FIG. 12. But it will be noted that even though contact at 54 is relieved to the point of opening the clearance 54', there nevertheless remains a slight resiliently stressed deformation of the clip, by means of which a set angular position can be retained. Once the ring and its shaft are adequately positioned, the clips 50 may be spread for oppositely wedged ring-to-shaft contact as by use of a simple tool. In the fully wedged position, the tongue parts 53 of clips 50 will of course lie primarily "flat" along the shaft and the eccentric counter bore, as will be understood. In another, and preferred employment, the clip 50 is designed to interfere at points 54-31-55 not only before but also after mounting on the shaft. In such case, there would of course be no clearance at 54 or at 54'.

What is claimed is:

1. In an antifriction bearing, inner and outer rings having opposed raceways and coaxially spaced by antifriction elements in said raceways, one of said rings having an annular axially extending end which is offset from the raceway region and which is defined between inner and outer cylindrical surfaces, the raceway region of said one ring being formed in or adjacent one of said cylindrical surfaces, the other of said surfaces at said end being relieved over a limited arcuate extent about an axis eccentric to the bearing axis, said one surface at said end including circumferentially extending radial flange means, and clip means of effective angular extent less than that of the region of eccentric relief and engaging over said flange means at said region of eccentric relief, said clip means being a stiffly compliant ribbon of form comprising a flange-engaging portion and a tongue portion of thickness less than the maximum radial extent of eccentric relief and of arcuate angular extent substantially less than that of the region of eccentric relief, said tongue portion projecting axially inwardly within the relief region of said one ring.

2. A bearing according to claim 1, in which the limited arcuate extent of said relief is less than 180° about the bearing axis.

3. A bearing according to claim 2, in which said limited arcuate extent is in the range between 90° and 140°.

4. A bearing according to claim 2, in which said limited arcuate extent is in the range of substantially 100° to 120°.

5. A bearing according to claim 2, in which said relief is provided in duplicate, symmetrically disposed and equally spaced about the bearing axis, whereby upon assembling the bearing with said one ring fitted to the member which is to have drive or support relation thereto, and upon angularly displacing said clip means to jam toward one convergent end of the crescent cavity defined between the first-mentioned recess and the fitted member, reacting support on the opposite side of the bearing axis is generated at regions adjacent both the circumferential limits of the duplicate eccentric relief.

6. A bearing according to claim 1, in which said clip means is provided in duplicate, the thickness of both tongues when in side-by-side adjacency being such as to be fully received within the relief region, whereby upon assembling the bearing with said one ring fitted to the member which is to have drive or support relation thereto, said clips may be displaced to jam toward the circumferential ends of the crescent cavity defined between the recess and the fitted member.

7. A bearing according to claim 1, in which said flange means is defined by a circumferentially continuous radial groove in said one surface at an axial location between the raceway and said end.

8. A bearing according to claim 7, in which said clip means is of generally C-shape with the tongue portion at one end and the flange-engaging portion at the other end, said clip means having an unstressed radial span between said tongue portion and said flange-engaging portion, said span exceeding the radial distance between the groove and the maximum radial depth of the relief, and said span being less than the radial distance between said flange and the maximum radial depth of the relief, whereby said clip means is self-retaining in its assembly to said one ring.

9. A bearing according to claim 1, in which said one ring is the inner bearing ring, with the said relief in the bore thereof.

10. A bearing according to claim 1, in which said one ring is the outer bearing ring, with the said relief in the outer surface thereof.

11. A bearing according to claim 9, in which the arc of said tongue portion is of radius which is substantially the bore radius.

12. A bearing according to claim 9, in which the arc of said tongue portion is of radius which is at least no greater than the bore radius.

13. A bearing according to claim 12, in which the arc of said tongue portion is of radius which is at least no less than the relief radius.

14. A bearing according to claim 10, in which the arc of said tongue portion is of radius which is substantially the radius of the outer surface of said outer bearing ring.

15. A bearing according to claim 10, in which the arc of said tongue portion is of radius which is at least no less than the radius of the outer surface of said outer bearing ring.

16. A bearing according to claim 15, in which the arc of said tongue portion is of radius which is at least no greater than the relief radius.

17. In combination, a machine element including a ring component sized to fit a given cylindrical mounting profile, said ring component having an annular axially extending end portion projecting in axially offset relation to a body portion and defined between inner and outer cylindrical surfaces, one of said surfaces being sized to fit to the given mounting profile, said one surface at said end being relieved over a limited arcuate extent about an axis eccentric to the axis of said one surface, said other surface at said end including circumferentially extending radial flange means, and clip means comprising a generally C-shaped stiffly compliant metal ribbon engaging over said flange means at a limited location thereof, said clip means including a tongue of thickness less than the maximum extent of eccentric relief and of arcuate extent substantially less than said limited arcuate extent, said tongue projecting axially inwardly within the relief region of said ring component, said clip means being limited to substantially said limited angular location.

18. The combination of claim 17, in which the profile to be fitted is a cylindrical shaft and in which said one surface is a bore in said ring component.

19. The combination of claim 17, in which the profile to be fitted is a cylindrical bore and in which said one surface is the outer surface of said ring component.

20. The combination of claim 17, in which said ring component is a bearing ring.

21. The combination of claim 17, in which said ring component is one of two relatively rotatable rings of an assembled bearing.

22. The combination of claim 17, in which the unstressed span between the tongue and the flange-engaging end of said clip means is such in relation to the effective radial and axial extent of the flanged end of said ring at the location of maximum relief thereof that said clip means is in resiliently stressed contact with said ring when assembled thereto.

23. In an antifriction bearing, inner and outer rings having opposed raceways and coaxially spaced by antifriction elements in said raceways, one of said rings having an annular axially extending end which is offset from the raceway region and which is defined between inner and outer cylindrical surfaces, the raceway region of said one ring being formed in or adjacent one of said cylindrical surfaces, the other of said surfaces at said end being relieved over a limited arcuate extent about an axis eccentric to the bearing axis, said one surface at said end having a circumferentially extending radial groove, thereby defining a radial flange at said end, and clip means engaging over said flange means at a limited angular location thereof and within said region of eccentric relief, said clip means being of generally C-shape with a flange-engaging portion at one end and including at the other end a tongue of thickness less than the maximum extent of eccentric relief and of arcuate extent substantially less than said limited arcuate extent, said tongue projecting axially inwardly within the relief region of said one ring, said tongue being of stiffly compliant material having an unstressed radial span between said tongue and said flange-engaging portion, said span exceeding the radial distance between the groove and the maximum radial depth of the relief, and said span being less than the radial distance between said flange and the maximum radial depth of the relief, whereby said clip means is self-retaining in its assembly to said one ring, said end of said one ring having a chamfer of radial extent which is in the order of magnitude of the depth of said groove, whereby said clip means may be axially assembled to said end by relying on the chamfer as a radial cam to spread and outwardly deform said clip means, for retention by resilient restoration to its unstressed state upon registry with the groove.

* * * * *